United States Patent [19]

Jago

[11] Patent Number: 4,673,325
[45] Date of Patent: Jun. 16, 1987

[54] GRIPPER APPARATUS FOR STACKING A BATCH OF SHEETS

[75] Inventor: John J. Jago, Liverpool, England

[73] Assignee: Pilkington Brothers P.L.C., Merseyside, England

[21] Appl. No.: 821,000

[22] Filed: Jan. 22, 1986

[30] Foreign Application Priority Data

Feb. 1, 1985 [GB] United Kingdom ............... 8502577

[51] Int. Cl.⁴ ............................................. B65G 57/28
[52] U.S. Cl. .................................. 414/103; 294/86.4; 294/88; 901/37; 901/39
[58] Field of Search ............... 294/67.2, 67.22, 67.31, 294/67.32, 86.4, 88, 902, 86.41; 414/103, 104, 108, 330; 901/31, 37, 39

[56] References Cited

U.S. PATENT DOCUMENTS

| | | | |
|---|---|---|---|
| 4,302,042 | 11/1981 | Kerr et al. | 294/67.22 |
| 4,489,970 | 12/1984 | Henke | 294/67.22 |
| 4,522,544 | 6/1985 | Shah et al. | 414/330 |

FOREIGN PATENT DOCUMENTS

| | | | |
|---|---|---|---|
| 1180681 | 10/1964 | Fed. Rep. of Germany | 414/108 |
| 1283155 | 11/1968 | Fed. Rep. of Germany | 414/108 |
| 600068 | 3/1978 | U.S.S.R. | 294/67.22 |
| 793918 | 2/1981 | U.S.S.R. | 294/67.22 |
| 962177 | 9/1982 | U.S.S.R. | 294/67.22 |

*Primary Examiner*—Frank E. Werner
*Assistant Examiner*—Janice Krizek
*Attorney, Agent, or Firm*—Burns, Doane, Swecker & Mathis

[57] ABSTRACT

Gripper apparatus for stacking a batch of sheets, for example glass sheets, comprises a gripper head having a sheet support for movement to grip the batch of sheets. A roller stop at the bottom of the sheet support engages behind one side of the batch and at least one clamp is movable to grip the batch against the support between that clamp and the stop. Tilting members at the bottom of the support are operable, when the support is in a substantially vertical position, to lift the batch over the roller stop as it is stacked.

21 Claims, 8 Drawing Figures

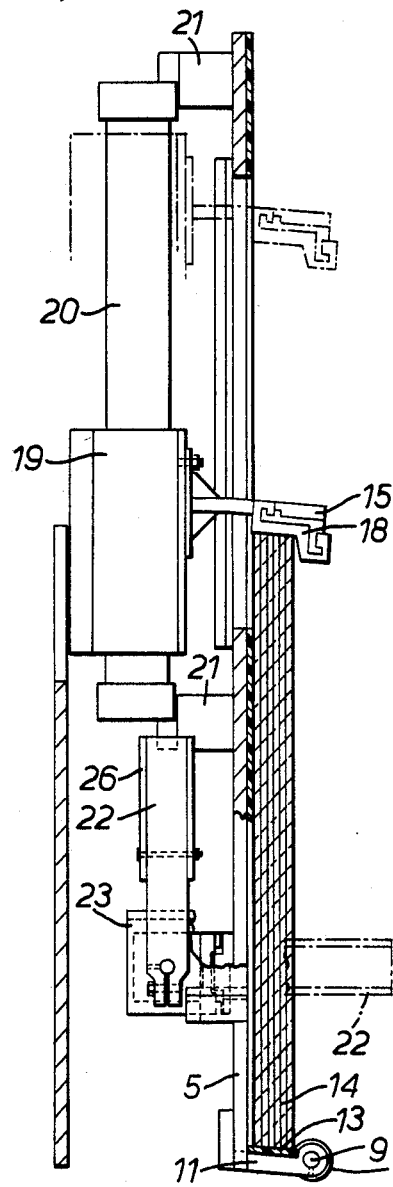
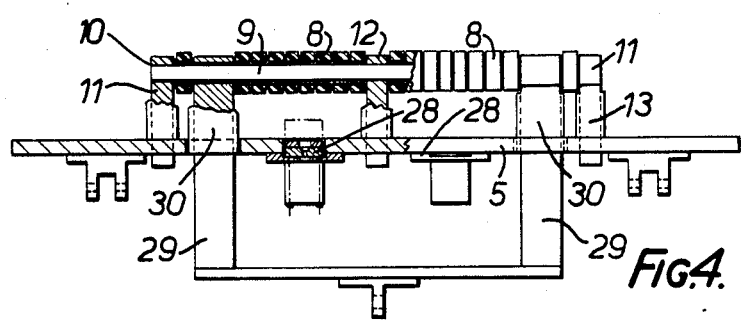
FIG. 3.
FIG. 4.

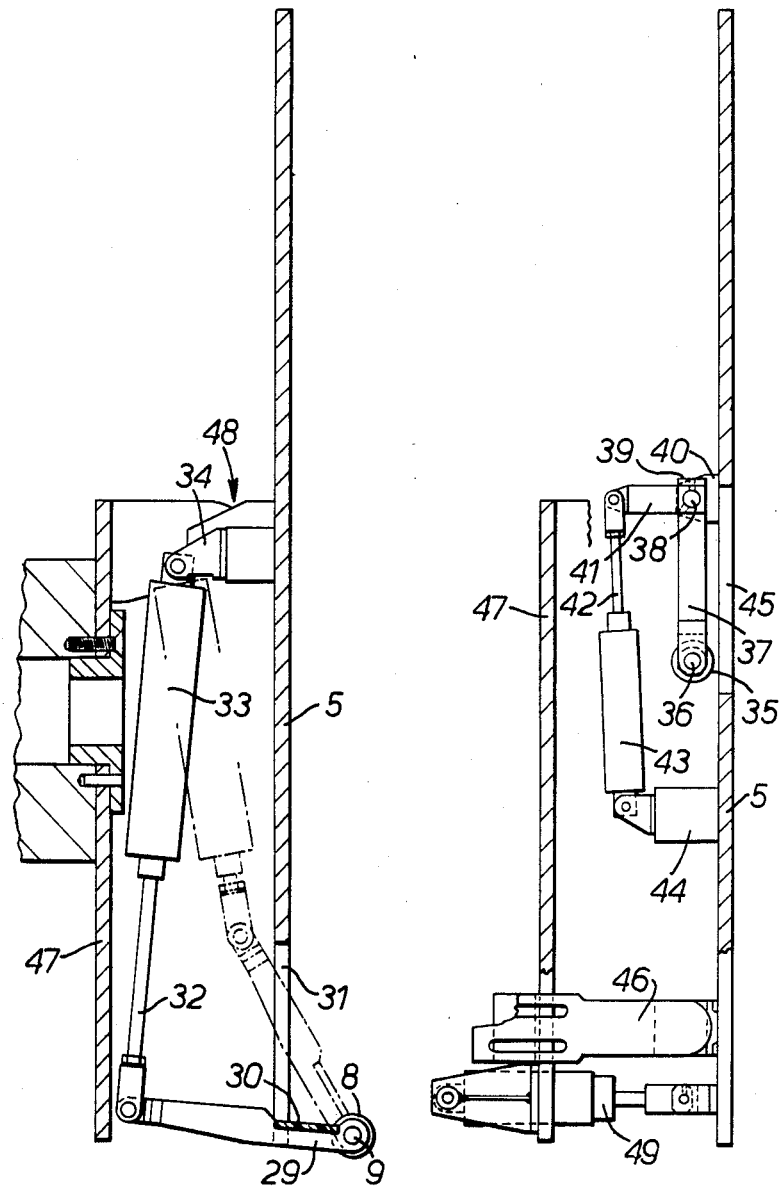

GRIPPER APPARATUS FOR STACKING A BATCH OF SHEETS

This invention relates to gripper apparatus for stacking a batch of sheets, especially glass sheets.

The invention is particularly concerned with apparatus for stacking batches of glass sheets of a size and weight which have in the past been stacked by hand, for example batches of sheets of window glass or horticultural glass, but it can be applied to larger and heavier sheets.

Such hand-stackable sheets of glass are usually cut from a ribbon of glass produced by one of the usual forming processes such as the float process, a vertical drawing process, or a rolling process. The ribbon of glass is cut automatically into sheets of saleable size which are batched on a substantially horizontal table at the outlet end of the forming and cutting line, with more than one sheet, for example ten sheets, in a batch.

It has been the custom to lift the batches of sheets of glass by hand from the table and to stack the sheets substantially vertically in transport pallets.

In DE-AS No. 1 180 681 it is proposed to produce a vertical stack of sheets from a continuous feed of individual sheets of glass on a conveyor, by means of a lifting table which lifts each sheet individually to a substantially vertical position with the lower edge of the sheet resting on rollers. By means of a ram which acts against the back of each sheet, when it is in a substantially vertical position, the lower edge of the sheet is caused to flip forwardly over the roller onto a support table on which the stack of vertically disposed sheets is formed, one sheet at a time.

Such earlier apparatus could not be employed for stacking glass sheets which are batched at the end of a continuous glass making line.

It is a main object of the present invention to provide an improved gripper apparatus which can be employed for stacking a batch of sheets, for example of glass. By doing this it is possible to cope more reliably with a production process operating at speed, to ensure that there is less wastage, and to ensure that each sheet in the eventual stack is correctly squared-up and aligned.

BRIEF SUMMARY OF THE INVENTION

According to the invention there is provided gripper apparatus for stacking a batch of sheets, comprising a gripper head having a sheet support for movement into position relative to a batch of sheets to be gripped, a stop at the bottom of that support and spaced therefrom for engaging behind one side of the batch, at least one clamp movable relatively to the support for engaging the batch to grip the batch gainst the support between that clamp and the stop, and at least one tilting member located at the bottom of the support and operable, when the gripper head is in a substantialy vertical stacking position, to lift the batch over the stop as it is stacked. Preferably the apparatus further includes at least one pusher member on the support operable to push the batch away from the support as it is lifted over the stop and stacked.

Two pusher members may be located in central apertures in the support between the lowermost position of the clamp and the bottom of the support. These pusher members are usually actuated substantially simultaneously with actuation of the tilting member to cause a movement of the batch of sheets "up-and-over" the stop into exact location against sheets already stacked or against the back of a pallet or the like.

In the preferred embodiment this gripper apparatus is mounted on the end of a robot arm and conventional robot control means are employed for effecting the movement of the parts of the apparatus and the transporting of the gripped batch of sheets from a production line to a stacking position, usually on a transporting pallet.

In the preferred embodiment the sheet support is a support plate. The stop may be a roller stop. Preferably the stop comprises a plurality of rollers which are free-running on a shaft parallel to and spaced from the support.

There may be two spaced tilting members which are pivotable on the shaft.

Further the clamp movable relatively to the support is preferably movable along the support. The clamp may comprise two clamping fingers which are slidable in slots in the support towards and away from the bottom of the support.

For further ensuring the correct transfer and positioning of the batch of sheets the gripper apparatus may comprise two side fingers mounted respectively on opposite sides of the support between the stop and the clamp, which fingers are hingedly mounted on brackets which are extendable beyond said opposite sides, whereby the side fingers can be positioned to protrude in front of the support, and engage the gripped batch of sheets. These side fingers may also be used to square up the batch of sheets when stacked.

Further according to the invention, for the automatic operation of the apparatus on its robot arm, the apparatus may comprise pneumatic operating means connected to the tilting member(s), the clamp(s) and the side fingers, and means including a proximity switch effective to sense location of the gripper head at a stacking position and to activate in sequence operation of the clamp(s), the side fingers, and the tilting member(s), and also the pusher member(s) if provided.

In operating the apparatus it may be employed usually for gripping, lifting and stacking batches of a predetermined number of sheets, for example ten or more, at a time. Less than the predetermined number of sheets may be gripped and stacked however and to accomodate smaller batches the apparatus may comprise spacing stops which are set in the support and can be caused to protrude from the support by a distance appropriate to the thickness of the batch of sheets to be gripped. That distance may, for example, be appropriate to a batch of sheets of half the normal predetermined number.

To give additional forward urge to a batch of sheets beings stacked, and to deter rebound each tilting member may be provided with a spring loaded element which is operable to push against the rear face of the batch as it is stacked.

BRIEF DESCRIPTION OF THE DRAWINGS

Some embodiments of the invention will now be described, by way of example, with reference to the accompanying drawings in which:

FIG. 3 is a part-section on line III—III of FIG. 2, FIG. 4 is a part-section on line IV—IV of FIG. 2, FIG. 6 is a section on line VI—VI of FIG. 5, FIG. 7 is a section on line VII—VII of FIG. 5.

DETAILED DESCRIPTION

Figure 1:
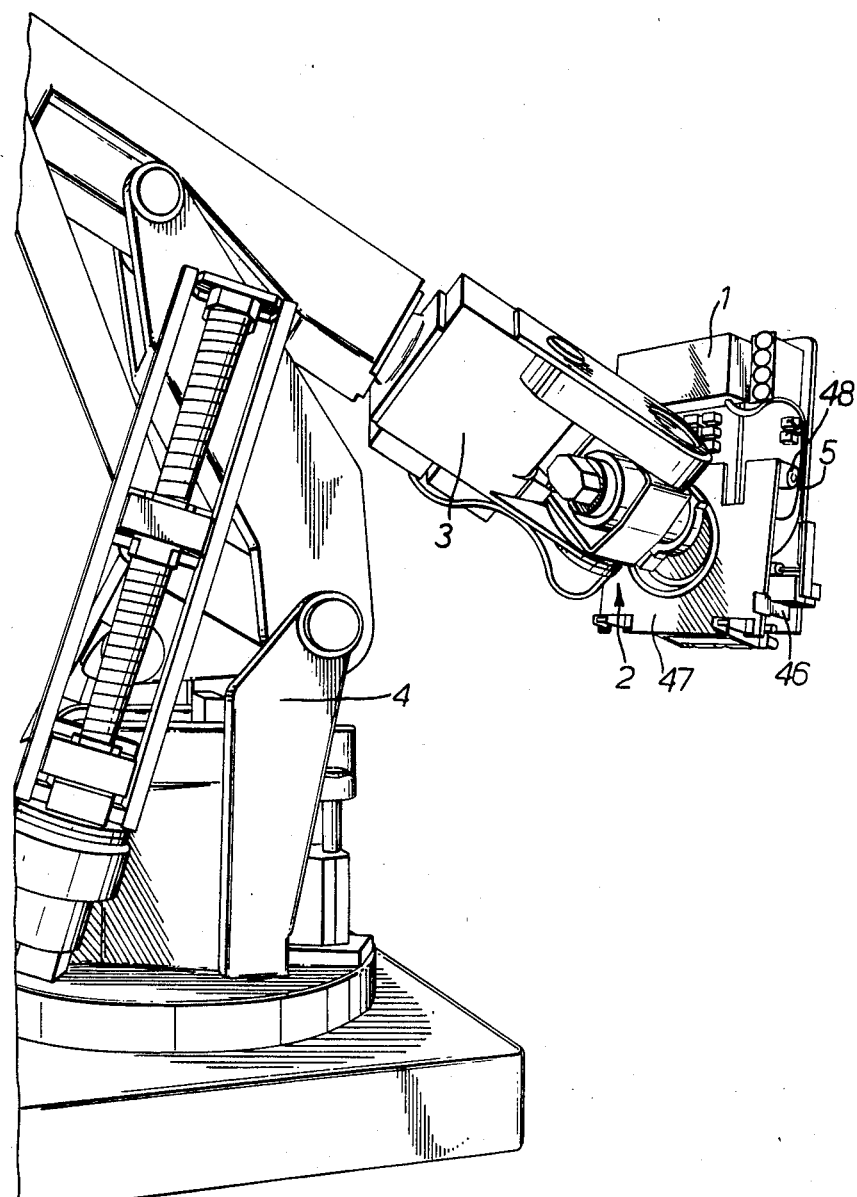
FIG. 1 is a general view of gripper apparatus according to the invention located on one end of a robot arm.

A gripper apparatus according to the invention for stacking a batch of glass sheets is shown generally in FIG. 1 and comprises a gripper head 1 which is pivotally mounted by a universal joint 2 on the end of a cantilivered arm 3 of a robot mechanism mounted on a massive column 4. The joint 2, the arm 3 and the column 4 are conventional. The gripper head is shown in FIG. 1 in its substantially vertical position which it will assume as it carries a batch of glass sheets for stacking in a substantially vertical stack. The controls of the robot make it possible for the head to rotate to a substantially downwardly-facing horizontal position in which it overlies and can then abut a batch of sheets to be gripped. As will be understood by those skilled in the art, some considerable departure from precisely vertical and horizontal positions may be tolerable and even desirable.

Figure 2:
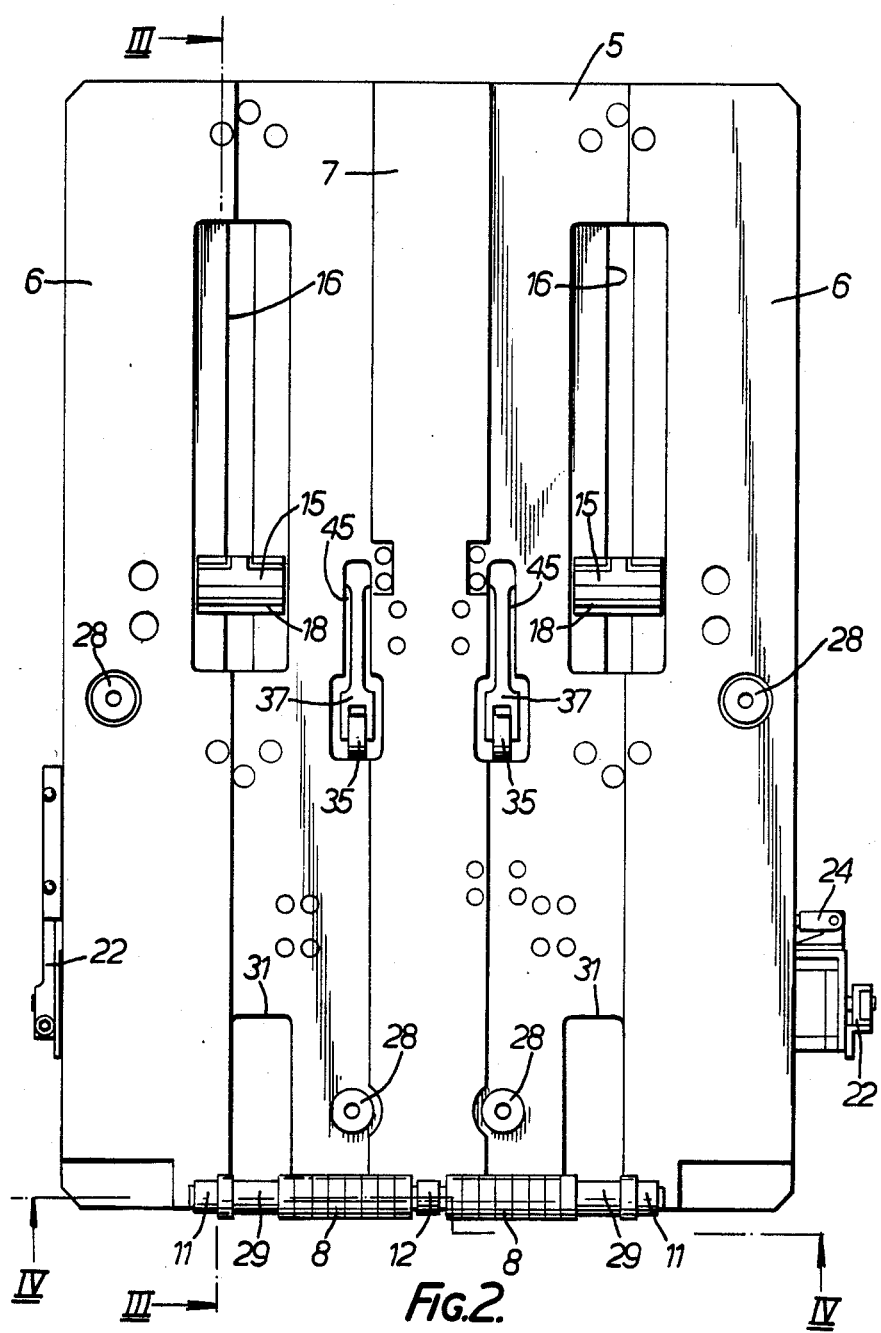
FIG. 2 is a front elevation of a sheet support of the gripper apparatus of FIG. 1.

The front face of the gripper head constitutes a sheet support 5 which in this embodiment is a support plate whose front elevation is illustrated in FIG. 2. The support plate is a metal plate of generally rectangular form which carries side strips 6 and a central strip 7 of thick polyurethane which acts as cushion between the metal plate 5 and the top sheet of the batch of sheets to be gripped.

A roller stop is mounted at the bottom of the support plate and is spaced therefrom for engaging behind one side of the batch of sheets. More detail of the roller stop is shown in FIGS. 3 and 4. The roller stop comprises a plurality of polyurethane rollers 8 which are free-running on a shaft 9 which extends between, and is fixed in ends 10 of brackets 11 which are fixed to the lower edge of the support plate 5. The shaft 9 passes through a central bracket 12 which is also fixed to the bottom of the support plate 5. The upper faces of the brackets 11 and 12 carry polyurethane cushions 13 to protect the lower edges of the glass sheets of the batch. The length of the brackets 11 and 12 is such that the rollers are spaced away from the frontal plane of the polurethane strips 6 and 7 by a distance equivalent to the combined thickness of the batch of glass sheets 14 and as shown in FIG. 3. The cushioned brackets 11 and 12 slope slightly downwardly towards the rollers when the support plate 5 is vertical and will therefore be horizontal when the plate is tilted slightly rearwardly.

When the batch of glass sheets 14 is gripped as described later, and the gripper head has been rotated to a substantially vertical carrying position, the back sheet of the batch abuts and rests against the cushions 6 and 7, the bottom lower edge of the front sheet of the batch engages the surfaces of the free-running stop rollers 8, and the weight of the batch of sheets mainly bears on the cushioned brackets 11 and 12.

While the gripper head is still substantially horizontal, with the roller stop behind one side of the batch at one end, the opposite end of the batch 14, which will be the upper end when stacked substantially vertically, is gripped by at least one clamp movable along the support, thereby gripping the batch against the support plate between that clamp and the roller stop.

In this preferred embodiment, and as illustrated in FIGS. 2 and 3, the clamp comprises two clamping fingers 15 which are slidable in slots 16 formed in the support plate 5 between the cushions 6 and 7. The clamping fingers 15 are slidable towards and away from the free-running rollers 8 at the bottom of the support, and each clamping finger comprises a wide finger member 15 which carries a shaped polyurethane cushion 18, the operative part of which has a inverted L-shape, whose longer leg provides a cushioning surface for engaging the upper edges of the glass sheets of the batch 14. This cushioning surface is substantially parallel to the glass-supporting surfaces of the lower cushions 13. The shorter stem of each L-shaped cushion 18 slopes slightly outwardly to provide a lead-in for the cushioning surface as the finger moves towards and beneath the side of the batch of sheets to be gripped by the finger. As can be seen from FIG. 3, the batch 14 is gripped with the roller stop 8 behind one side of the batch at one end and the shorter stem of the cushions 18 behind that side of the batch at the other end. Each of the fingers is mounted on a slide 19 of a pneumatic rodless cylinder 20 which is mounted between brackets 21 on the rear of the support plate as shown in FIGS. 3 and 5.

In operation the gripper head is rotated on the end of the arm 3 until the front face of the support plate is parallel to the upper surface of the batch of substantially horizontal glass sheets to be gripped and stacked. Provision is made for the rollers 8 of the roller stop to pass beneath and engage behind one side of the batch at one end, and the cylinders 20 are then operated to cause the clamping fingers to move towards the rollers 8 and to engage the opposite end of the batch as indicated in FIG. 3. The batch of glass sheets can then be lifted by the gripper apparatus and the head turned to a substantially vertical position.

Figure 5:
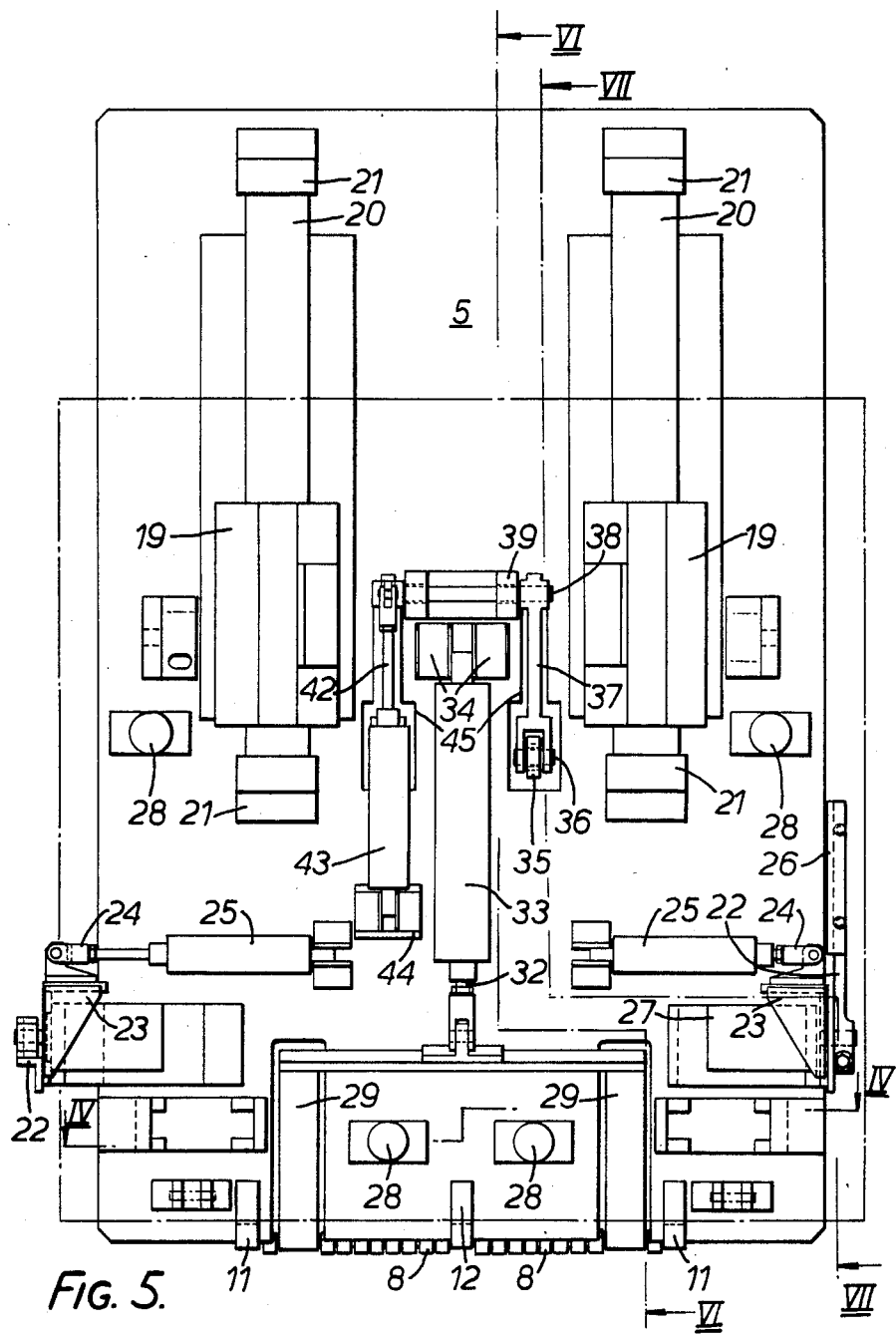
FIG. 5 is an elevation of the back of the sheet support showing the location of movable members and of pneumatic operating means.

For added security to prevent sideways slipping of the batch of sheets, there are two side fingers 22, FIGS. 2, 3 and 5, mounted respectively on opposite sides of the support plate 5 between the rollers and the clamping fingers. Each of the fingers 22 can be rotated upwardly to a retracted position as illustrated on the left hand side of FIG. 2 and the right hand side of FIG. 5 or rotated downwardly to the operative position, as shown on the right hand side of FIG. 2, and the left hand side of FIG. 5. The retracted and operative positions are also shown in FIG. 3 in full and broken line respectively. Movement between these positions is effected by operation of a semi-rotating pneumatic cylinder device 27 of known form incorporating an inner piston and rack and pinion mechanism.

Each finger 22 carries a polyurethane cushion 26, and forms an assembly with its cylinder 27 and a bracket 23.

Each of the assemblies of bracket 23 with its finger 22 and cylinder 27 is slidable in a direction parallel to the plane of the support plate by operation of a linkage 24 connected to a piston rod of a pneumatic cylinder 25. In this way the side fingers can be spread open beyond the sides of the support plate, and then be rotated downwardly to the operative position. The finger 22 shown in FIG. 2 on the right and in FIG. 5 on the left is in its spread or extended position while the finger 22 on the left of FIG. 2 and the right of FIG. 5 is in its withdrawn position against the side of the support plate. By operation of the cylinders 25, the fingers 22 are moved back inwardly from their spread positions, so that the faces of the cushions 26 are brought into engagement with the sides of the glass sheets of the batch to ensure that the glass sheets are held securely during movement of the gripper head.

As shown in FIGS. 2 and 5 there are also four spacing stops 28, two of which are positioned on the support plate 5 just above the rollers 8, the other two being higher up and further out towards the sides of the support plate. Each of the stops 28 has a polyurethane facing. Normally, for example when gripping and lifting batches of ten sheets of glass, these spacer stops would be set with their faces flush with the plane of the surface of the polyurethane cushions 6 and 7. If however a lesser number of sheets is to be lifted in each batch these stops could be moved outwardly proud of the faces of the cushions 6 and 7 so that the front faces of the stops would lie in a plane which is spaced by a distance equivalent to the thickness of the batch of sheets to be gripped, from the effective line of contact of the front sheet of the batch with the rollers 8. These spacing stops 28 may be arranged when operated to project a fixed pre-set distance, for example to accommodate a batch containing one half the normal number of sheets.

At the bottom of the support plate there is at least one tilting member, in the preferred embodiment two spaced tilting members 29 which are shown in more detail in FIG. 6. Each of these tilting members 29 is in the form of a lever, the outer end of which is pivotable on the shaft 9 near the ends of the sets of free-running rollers 8 as shown in FIG. 4. Each of the members 29 is shaped with an upper, recessed, sloping surface which carries a cushion 30 of polyurethane which matches in thickness and angle the cushions on the brackets 11 and 12. These cushions thereby form a movable support surface for the lower edges of the batch 14 of glass sheets as illustrated in FIG. 6. Each of the tilting members 29 passes through a slot-shaped aperture 31 in the support plate and they are joined to a cross bar which is pivotally connected to the lower end of a piston rod 32 slidable in a pivotally mounted cylinder 33. The upper end of the cylinder 33 is pivotally mounted in trunnions 34 to a fixed back face of the support plate. FIG. 6 illustrates how retraction of the piston rod 32 into the cylinder 33 causes the tilting members 29 to tilt upwardly about their pivotal connection on the shaft 9. The members 29 are shown in their upwardly tilted position in FIG. 5 and in broken line in FIG. 6.

Also mounted behind the support plate 5 are two pusher members in the form of polyurethane rollers 35 which are free-running on spindles 36. Each spindle 36 is mounted in a yoke or bifurcated arm 37 which is fixed to a shaft 38 mounted in bearings 39 on the back face of the support plate by means of brackets 40 as shown in FIG. 7. Also fixed to the shaft 38 is an operating lever 41 which is pivotally linked to the upper end of a piston rod 42 which is slidable in a pneumatic cylinder 43 whose blind end is pivotally mounted in trunnions on a bracket 44 which is also connected to the back face of the support plate. Actuation of the cylinder 43 to retract the piston rod 42 causes the shaft 38 to rotate and the arms 37 to swing outwardly through apertures 45 in the support plate between the lowermost positions of the two clamping fingers and the bottom of the support plate. The rollers 35 engage and push the batch of sheets 14 away from the support plate 5.

FIG. 7 also shows the location of a proximity switch 46 which is directed towards the back of the support plate and effectively senses when the gripper head, carrying a batch of sheets, is at a stacking position where the batch is to be deposited against sheets already stacked on a transport pallet or, with a first batch, against the pallet back. The proximity switch 46 is adjustably mounted on a back plate 47 to which the support plate 5 is connected by a hinge 48 (FIGS. 1 and 6). A spring device 49 between the back and support plates urges them apart to a required spacing. When the support plate 5 is pushed rearwardly relatively to the back plate 47 against the spring action to an extent which reduces that spacing below a pre-set value, i.e. gets within a pre-set distance from the proximity switch 46, the switch operates. Such relative rearward pushing of the support plate 5 occurs when the rollers 8 engage against the front face of a stack of sheets, or against the back of a pallet, as the head is advancing. The proximity switch then activates control means of conventional kind which control the cylinder 33 connected to the tilting members 29, the cylinders 19 connected to the clamping fingers 15 and the cylinders 25 and 27 which control the side fingers 22, to effect their operation in a required stacking sequence.

The hinge 48 between the back plate 47 and the support plate 5 is provided by connections at both sides of the plates (only the near side connection being visible in FIG. 1), and an emergency switch is carried at the far side of the back plate 47 at a position corresponding to that of the proximity switch on the near side. Such emergency switch can be set for actuation to stop all movement and operation of the robot and gripper head in the event that the support plate 5 moves rearwardly relatively to the back plate 47 beyond the proximity setting of the switch 46 indicating some sort of control failure.

In operation the substantially horizontal gripper head initially descends over a batch of glass sheets on a table. The batch of glass sheets 14 is then gripped against the support plate 5 by the rollers 8 and clamps 15. At this stage the side fingers 22 and the pusher members 35 are retracted, and the tilting members 29 are in their lowermost position as shown in FIG. 6. The side fingers 22 are, however, spread beyond the support plate sides.

As the gripper head with the gripped batch of glass sheets 14 is moved upwardly away from the batch supporting table, the cylinders 27 and 25 are operated to rotate the side fingers 22 downwardly to their operable position and then to move those side fingers 22 inwardly to engage the side edges of the batch. This ensures that the batch is firmly held with no danger of any of the sheets slipping sideways out of the grip of the head.

The gripper head is moved angularly to a substantially vertical position as shown in FIG. 3, and the robot arm then carries the batch away from the table and rotates towards the pallet. When the robot arm has ceased its rotation towards the pallet the side fingers 22 are spread outwardly and the robot then moves the head forwardly towards the pallet. As the gripper head, in the vertical position, approaches the pallet, the robot mechanism decelerates the forward movement of the gripper head. Usually two stacks of sheets are formed side by side in a transport pallet and during the approach of the gripper head to one side of such a pallet the side finger 22 on that side of the head is hinged upwardly to its retracted position and then moved inwardly out of the way behind the gripped batch. The gripper head is then free to move accurately into the extreme side position of the pallet for stacking the batch of sheets against those sheets already stacked on that side of the pallet, or against the back of the pallet.

The bottom of the support plate and the rollers 8 move into the pallet just above the cushioned surface of glass supporting feet of the pallet, and when the rollers 8 engage against the front stacked sheet or the pallet back and urge the support plate 5 rearwardly relatively to the still advancing back plate 47, the proximity switch 46 operates since the gripper head is at the required position. Advancement of the gripper head is halted at that stacking position and the head then slowly withdraws. The cylinders 20 are actuated to raise the clamping fingers 15 and free the upper edges of the glass sheets, and the cylinders 33 are actuated to pivot the tilting members 29 upwardly while at the same time the cylinders 43 are actuated and the two pusher rollers 35 swing outwardly through the apertures 45 in the support plate. The batch of sheets 14 is raised upwardly by the tilting members 29, the sheets meanwhile sliding against each other and the back sheet sliding to a small extent against the cushions 6 and 7, and this raising movement, coupled with the push given to the batch by the members 35, impels the batch of sheets accurately over the rollers and stacks them to begin the stack or in front of the sheets already stacked on the support feet of the pallet. The impelling of the batch of sheets over the rollers 8 occurs when the head has withdrawn a distance such that the space between the rollers 8 and the front face of the previously stacked sheets, or of the pallet back, is just sufficient to accommodate the thickness of the batch being stacked. This batch is thus stacked right against the previously stacked sheets, or the pallet back, without leaving an unwanted gap. The side finger 22 which is still down in its operating position is then moved inwardly to nudge the newly stacked batch sideways so as to ensure correct squaring up and alignment of the previously stacked sheets. That side finger 22 is then moved outwardly and retracted and the other members of the gripper head are relocated ready for the next operation as the robot withdraws the head and then swings the arm 3 back to bring the gripper head over and into abutment with the next batch of sheets to be gripped which has formed meanwhile on the support table during the stacking of the previous batch.

By this apparatus automatic gripping and substantially vertical stacking of batches of initially substantially horizontal cut glass sheets is achieved accurately with a great saving of time, without manual effort, and with less danger of breakage of the sheets or of damage to the edges of the sheets when the sheets are being correctly located on a storage pallet. As previously indicated and as is common in the art, the sheets in the batch may initially be inclined to the horizontal and in the stack may be inclined to the vertical, for example at an inclination of about 10°.

In some circumstances the pushers 35 may be unnecessary and the momentum of the batch of sheets may be sufficient to carry it onto the stack when the tilting members 29 operate to impel the lower end of the batch over the rollers 8.

As previously mentioned, the gripped batch may sometimes contain less than the normal number of sheets, for example half that number, and the spacer stops 28 may then protrude from the support plate 5 to make up the missing thickness. It will be seen, however, that with the normal timing of the stacking operation the space between the rollers 8 and the front face of the previously stacked sheets, or the back of the pallet, will be greater than the thickness of the reduced size batch when the latter is impelled over the rollers 8. This runs the risk of an unwanted gap in the stack. To counter this the tilting members 29 may each be provided with a spring loaded element which pushes against the rear face of the batch when the tilting members impel it over the rollers 8 so as to give it an additional forward urge and particularly to deter rebound as it is stacked.

Figure 8:
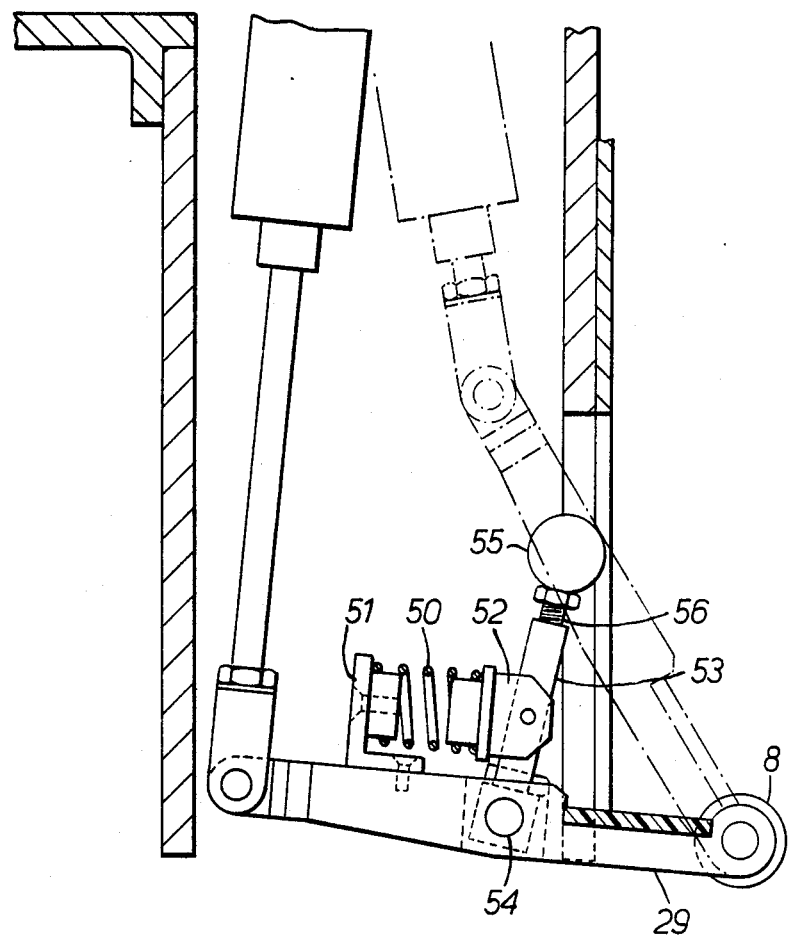
FIG. 8 is a view similar to FIG. 6 of a modification of the apparatus.

Such a spring loaded element is shown in FIG. 8. It has a compression spring 50 located between a rear bracket 51 fixed to the tilting member 29 and a front bracket 52 pivotally connected to a rod 53. One end of the rod 53 is connected at a pivot 54 to the tilting member 29 and the other end carries a polyurethane ball 55. The ball 55 has an internally threaded hole and is screwed on to an externally threaded end part 56 of the rod 53 so that the ball position is adjustable. In operation the action of the spring 50 urges the ball 55 against the rear face of the batch as the tilting member 29 impels it over the rollers 8 and deters rebound.

It will be appreciated that the specific embodiment shown and described is given by way of illustration and example and various possible modifications will be apparent to those skilled in the art. Notably, other forms of roller stop could be employed which need not necessarily comprise a plurality of rollers, or a stop not of roller form might be used, for example a shaped non-rotary member of a material over which the glass can readily slide. The clamp(s) need not necessarily be movable along the support but could, as a further example, have an angular motion. The support need not necessarily be in the form of a plate. Also, although especially suitable for handling glass sheets, apparatus according to the invention could be used for stacking sheets of other materials.

I claim:

1. Gripper apparatus for stacking a batch of sheets comprising a gripper head having a sheet support for movement into position relative to a batch of sheets to be gripped, lower support means for the bottom of the batch, a stop associated with said lower support means and spaced from said sheet support for engaging behind one face of the batch of sheets, at least one clamp movable relative to said sheet support for engaging the batch to grip the batch against said sheet support between that clamp and said lower support means, tilting means associated with said lower support means at the bottom of said sheet support, and means for operating said tilting means, when the gripper head is in a substantially vertical stacking position, to cause said tilting means to come from beneath said lower support means and lift the batch of sheets from said lower support means and over the stop as the batch is stacked.

2. Apparatus according to claim 1, further including at least one pusher member on said sheet support operable to push the batch away from said sheet support as the batch is lifted over the stop and stacked.

3. Apparatus according to claim 2, comprising two pusher members located in central apertures in said sheet support between the lowermost position of the clamp and the bottom of said sheet support.

4. Apparatus according to any one of claims 1 to 3, wherein the sheet support is a support plate.

5. Apparatus according to any one of claims 1 to 3, wherein said lower support means for said batch of sheets comprises support brackets at the bottom of said sheet support and the stop is a roller stop which is mounted on and extends between said support brackets.

6. Apparatus according to claim 5, in which the stop comprises a plurality of rollers which are free-running on a shaft carried by said brackets and extending parallel to and spaced from said sheet support.

7. Apparatus according to claim 6, wherein said tilting means comprises two spaced tilting members which are pivotable on said shaft to lift the batch of sheets from said support brackets and impel the bottom edges of the sheets over said rollers.

8. Apparatus according to claim 7, in which each tilting member is provided with a spring loaded element which is operable to push against a rear face of the batch as it is stacked.

9. Apparatus according to claim 4, in which the clamp is movable along the support plate.

10. Apparatus according to claim 9, in which the clamp comprises two clamping fingers which are slidable in slots in the support plate towards and away from the bottom of the support plate.

11. Apparatus according to claim 1, comprising two side fingers respectively mounted on opposite sides of said sheet support between the stop and the clamp, which fingers are hingedly mounted on brackets which are extendable beyond said opposite sides, whereby the side fingers can be positioned to protrude in front of said sheet support, and engage the gripped batch of sheets.

12. Apparatus according to claim 11, comprising pneumatic operating means connected to the tilting member(s), the clamp(s) and the side fingers, and means including a proximity switch effective to sense the location of the gripper head at a stacking position and to activate in sequence operation of the clamp(s), the side fingers, and the tilting means.

13. Apparatus according to claim 1, comprising spacing stops which are set in said sheet support and can be caused to protrude from said sheet support by a distance appropriate to the thickness of the batch of sheets to be gripped.

14. Apparatus according to claim 12, including at least one pusher member on said sheet support operable to push said batch of sheets away from said sheet support as said batch is lifted over said stop and stacked, and wherein said pneumatic operating means is connected to said pusher member(s) to activate operation thereof in sequence with said tilting means.

15. Gripper apparatus for stacking a batch of sheets, comprising a gripper head having a support plate for movement into position relative to a batch of sheets to be gripped, support brackets at the bottom of said support plate for supporting the bottom of said batch of sheets, a roller stop carried by said support brackets at the bottom of said support plate and spaced from said support plate for engaging behind one face of the batch of sheets, at least one clamp movable relative to said support plate for engaging the batch to grip the batch against said support plate between said clamp and said support brackets, at least one tilting member located at the bottom of said support plate and associated with said support brackets, and means for operating said at least one tilting member, when the gripper head is in a substantially vertical stacking position, to cause said tilting member to come from beneath said support brackets and lift the batch over said roller stop as the batch is stacked.

16. Apparatus according to claim 15, in which said at least one clamp comprises two clamping fingers which are slidable in slots in said support plate towards and away from the bottom of said support plate.

17. Apparatus according to claim 16, comprising a pair of side fingers, each of the pair respectively mounted on opposite sides of said support plate between said roller stop and said at least one clamp, which fingers are hingedly mounted on brackets which are extendable beyond said opposite sides of said support plate, whereby said side fingers can be positioned to protrude in front of said support plate and engage the gripped batch of sheets.

18. Apparatus according to claim 15, wherein said roller stop comprises a plurality of rollers which are free-running on a shaft mounted on said support brackets so as to be parallel to and spaced from said support plate, and two spaced tilting members are pivotally mounted on said shaft and are operable to lift the batch over said plurality of free-running rollers.

19. Apparatus according to claim 18, in which each tilting member is provided with a spring loaded element which is operable to push against a rear face of the batch as it is stacked.

20. Apparatus according to claim 15, comprising spacing stops which are set in said support plate and can be caused to protrude from said support plate by a distance appropriate to the thickness of the batch of sheets to be gripped.

21. Apparatus according to claim 17, comprising pneumatic operating means connected to said at least one tilting member, said clamping fingers and said side fingers, and means including a proximity switch effective to sense the location of the gripper head at a stacking position and to activate in sequence the operation of said clamping fingers, said side fingers and said at least one tilting member.

* * * * *